US007912668B2

(12) United States Patent
Stephan et al.

(10) Patent No.: US 7,912,668 B2
(45) Date of Patent: Mar. 22, 2011

(54) SYSTEM FOR DETERMINING THE TRUE ELECTRICAL CHARACTERISTICS OF A DEVICE

(75) Inventors: George Stephan, Lakeville, MA (US); Frederick Loeb, Scituate, MA (US); John Howley, Milton, MA (US); Ludgero Leonardo, Stoughton, MA (US); Stuart Patterson, Walpole, MA (US)

(73) Assignee: Analog Devices, Inc., Norwood, MA (US)

( * ) Notice: Subject to any disclaimer, the term of this patent is extended or adjusted under 35 U.S.C. 154(b) by 915 days.

(21) Appl. No.: 10/865,458

(22) Filed: Jun. 10, 2004

(65) Prior Publication Data

US 2004/0259435 A1 Dec. 23, 2004
US 2010/0112875 A9 May 6, 2010

Related U.S. Application Data

(63) Continuation-in-part of application No. 10/464,951, filed on Jun. 19, 2003.

(60) Provisional application No. 60/391,119, filed on Jun. 24, 2002.

(51) Int. Cl.
*G06F 3/00* (2006.01)
(52) U.S. Cl. ......... 702/117; 702/118; 702/120; 702/121
(58) Field of Classification Search .............. 702/60, 702/121, 122, 184, 188, 198, 117, 118, 120; 307/125; 379/201.05; 710/1; 370/353; 381/5–7
See application file for complete search history.

(56) References Cited

U.S. PATENT DOCUMENTS

| 4,737,657 | A | 4/1988 | Jatko et al. |
|---|---|---|---|
| 4,792,986 | A | 12/1988 | Garner et al. |
| 4,972,457 | A | 11/1990 | O'Sullivan |
| 5,259,025 | A | 11/1993 | Monroe et al. |
| 5,278,904 | A | 1/1994 | Servi |
| 5,742,685 | A | 4/1998 | Berson et al. |
| 5,859,522 | A | 1/1999 | Theobald |
| 6,054,846 | A | 4/2000 | Castleman |
| 6,069,960 | A | 5/2000 | Mizukami et al. |
| 6,185,627 | B1 * | 2/2001 | Baker et al. ............... 710/1 |
| 6,339,831 | B1 | 1/2002 | Sugawara et al. |

(Continued)

FOREIGN PATENT DOCUMENTS

EP 1133185 A2 9/2001

(Continued)

OTHER PUBLICATIONS

Microsoft Corp., Analog Audio Classification Using Device Impedance Characteristics, Version 1.0 (Apr. 16, 2002).

(Continued)

*Primary Examiner* — Eliseo Ramos Feliciano
*Assistant Examiner* — Felix E Suarez
(74) *Attorney, Agent, or Firm* — Bingham McCutchen LLP (57) ABSTRACT

A system and method for determining the true electrical characteristics of a device. A codec is configured to measure at least one electrical characteristic of a device connected to a jack and to identify the device based on the measured electrical characteristics. An updateable database is populated with application circuit information and a software routine is responsive to the measured electrical characteristic and configured to adjust the electrical characteristics measured by the codec based on the application circuit information in the database.

21 Claims, 9 Drawing Sheets

U.S. PATENT DOCUMENTS

| | | | |
|---|---|---|---|
| 6,473,332 B1 | 10/2002 | Ignatiev et al. | |
| 6,498,791 B2 * | 12/2002 | Pickett et al. | 370/353 |
| 6,509,659 B1 | 1/2003 | Carroll et al. | |
| 6,643,364 B1 * | 11/2003 | Takahashi | 379/201.05 |
| 6,654,840 B1 | 11/2003 | Gendo et al. | |
| 6,684,262 B1 | 1/2004 | Miller et al. | |
| 6,856,046 B1 * | 2/2005 | Scarlett et al. | 307/125 |
| 6,859,538 B1 | 2/2005 | Voltz | |
| 6,862,636 B2 | 3/2005 | Young | |
| 6,877,008 B1 | 4/2005 | Kirkpatrick et al. | |
| 6,877,043 B2 | 4/2005 | Mallory et al. | |
| 6,970,752 B1 | 11/2005 | Lim et al. | |
| 7,002,265 B2 * | 2/2006 | Potega | 307/149 |
| 7,024,539 B2 | 4/2006 | Bresemann et al. | |
| 7,039,205 B1 | 5/2006 | Carter et al. | |
| 7,099,481 B2 | 8/2006 | Baker et al. | |
| 7,110,799 B1 | 9/2006 | Willins et al. | |
| 7,286,678 B1 | 10/2007 | Bachler et al. | |
| 7,366,577 B2 * | 4/2008 | DiSanza et al. | 700/94 |
| 7,601,032 B2 | 10/2009 | Labarca et al. | |
| 2002/0133245 A1 | 9/2002 | Lee et al. | |
| 2002/0172371 A1 | 11/2002 | Baker et al. | |
| 2003/0002988 A1 | 1/2003 | Jackson et al. | |
| 2003/0052712 A1 | 3/2003 | Comer | |
| 2004/0081099 A1 | 4/2004 | Patterson et al. | |
| 2004/0101144 A1 | 5/2004 | Lee | |
| 2004/0122541 A1 | 6/2004 | Disanza et al. | |
| 2004/0259435 A1 | 12/2004 | Stephan et al. | |
| 2004/0260846 A1 | 12/2004 | Stephan et al. | |
| 2005/0086175 A1 | 4/2005 | Brique et al. | |

FOREIGN PATENT DOCUMENTS

| | | |
|---|---|---|
| EP | 1191770 A2 | 3/2002 |
| EP | 1315361 A1 | 5/2003 |
| JP | 4079721 A | 3/1992 |
| JP | H06-018635 A | 1/1994 |
| WO | WO-9962180 | 12/1999 |
| WO | WO-2004057711 A1 | 7/2004 |
| WO | WO-2004079873 A1 | 9/2004 |

OTHER PUBLICATIONS

Decision of Rejection in Japanese Patent Application No. 2004-516222, mailed Jun. 12, 2007 (2 pages).

Decision of Rejection in Japanese Patent Application No. 2007-527790, mailed Mar. 3, 2009 (2 pages).

Intel Corporation, "Audio Codec '97," (Rev 2.3, Apr. 2002).

International Preliminary Report on Patentability in International Patent Application No. PCT/US2005/020680, mailed Sep. 18, 2008 (8 pages).

International Preliminary Report on Patentability in International Patent Application No. PCT/US2005/020687, mailed Jun. 7, 2007 (7 pages).

International Search Report and Written Opinion in International Patent Application No. PCT/US2005/020680, mailed Jul. 30, 2008 (10 pages).

International Search Report and Written Opinion in International Patent Application No. PCT/US2005/020687, mailed Apr. 26, 2007 (8 pages).

International Search Report in International Patent Application No. PCT/US03/19971, mailed May 4, 2004 (4 pages).

Microsoft Corporation, "Analog Audio Classification Using Device Impedance Characteristics," Version 1.0 (Apr. 16, 2002).

Office Action in Chinese Patent Application No. 200580016297.X, mailed Oct. 24, 2008 (6 pages).

Office Action in Japanese Patent Application No. 2004-516222, mailed Nov. 21, 2006 (3 pages).

Office Action in Japanese Patent Application No. 2007-527790, mailed Aug. 5, 2008 (4 pages).

Office Action in Japanese Patent Application No. 2007-527791, mailed Aug. 5, 2008 (2 pages).

Supplementary European Search Report in European Patent Application No. 03761308.0, mailed May 15, 2009 (4 pages).

Examination Report issued for European Patent Application No. 05760317.7, mailed Jul. 19, 2010 (5 pages).

English Translation of Official Inquiry in Japanese Patent Application No. 2004-516222, mailed Oct. 13, 2009 (3 pages).

Supplementary European Search Report in European Patent Application No. 05760317.7, mailed Oct. 20, 2009 (3 pages).

Supplementary European Search Report in European Patent Application No. 05759775.9, mailed Nov. 12, 2009 (3 pages).

Examination Report in European Patent Application No. 05759775.9, mailed Apr. 21, 2010 (4 pages).

Examination Report in European Patent Application No. 03761308.0, mailed Aug. 21, 2009 (4 pages).

English translation of Appeal Decision of Rejection in Japanese Patent Application No. 2004-516222, mailed Jun. 22, 2010 (10 pages).

* cited by examiner

SYSTEM FOR DETERMINING THE TRUE ELECTRICAL CHARACTERISTICS OF A DEVICE

RELATED APPLICATIONS

This application is a Continuation-in-part application of application Ser. No. 10/464,951 filed Jun. 19, 2003, which itself claimes priority to provisional patent application Ser. No. 60/391,119, filed Jun. 24, 2002.

FIELD OF THE INVENTION

This invention relates to a system useful for determining the true electrical characteristics of a device connected to a jack (e.g., input/output connector) of a computer including a codec.

BACKGROUND

Codecs process audio signals in a computer such as PCs and handheld devices. One of the primary functions of an audio codec is to convert both input and output audio signals to and from the internal digital signal format of the computer and the typically analog signal format of external devices plugged into the computer. The codec is typically embodied in a chip on the motherboard add-in/riser card along with one or more application circuits for the various jacks. The CPU, the processor, the memory, and the core logic are also typically motherboard level devices.

One method of connecting external audio devices to the computer is to use a 3.5 mm or similar stereo audio jack. Each computer contains several jacks, which have typically been dedicated to a single function each, such as a stereo line out for speakers, a microphone input, and a line input. With the increase in multimedia formats available today, there is a need for increasing the number of input and output audio devices that the computer can support without increasing the current number of jacks on the computer which would increase the cost of the system. Even with just a few jacks, computer users incorrectly connect external devices to the wrong jack which leads to costly support calls. Increasing the number of jacks on the computer would only increase the likelihood that a user would incorrectly connect an external device to the wrong jack further increasing the number of costly support calls.

In the patent application filed Jun. 19, 2003 referenced above and hereby incorporated herein by this reference, the applicant hereof discloses codec circuitry which uniquely measures the electrical characteristics of a device plugged into a jack as a way to identify the device. Then, a reconfigurable circuit is activated to make sure the identified device is correctly supported. The Intel Corporation, in the specification entitled "Audio Codec '97" (Rev 2.3, April 2002), also incorporated herein by this reference, calls the device identification data the "sensed bits." Another Intel specification incorporated herein by this reference is entitled "First Generation Intel® Audio PnP User Model and Methodologies" (Rev 1.1, Aug. 12, 2002). That specification discloses, inter alia, the idea of prompting the user to verify that the identification of the device output by the codec is correct.

It would be possible to provide logic in the codec which compensates for the electrical characteristics of the application circuit when the electrical characteristics of a device plugged into the jack are measured by the codec to identify the device. But, as between different manufacturers and as between different production runs, the specific components of an application circuit can change and/or change in value. Accordingly programming the codec to compensate for a set of electrical characteristics subject to change is not a reliable solution. And, the Intel specification fails to teach or suggest an alternative solution: in fact it does not even identify the problem posed by the application circuit in making a device identification.

Finally, although the Intel specification discusses the idea of querying the user to verify the correctness of the identification made by the codec, it would be extremely awkward and annoying if the user had to make the same correction every time the user plugged in the same device. That is, if each time the codec incorrectly identified headphones as a speaker the user had to make the same correction each time the user plugged the headphones into the personal computer, the user would quickly become frustrated. The Intel specification also fails to identify this problem or a solution.

The subject invention solves both problems via a unique middleware application responsive to the codec driver and the user interface as an alternative to attempting to solve these problems at the codec/motherboard level.

SUMMARY OF THE INVENTION

It is therefore an object of this invention to provide a system for and method of determining the true electrical characteristics of a device plugged into the jack (e.g., input/output connector) of a computer.

It is a further object of this invention to provide such a system for and method of verifying the identification of such a device.

It is a further object of this invention to provide a system and method which reduces costly support calls.

It is a further object of this invention to provide such a system and method which is fully compliant with the specification for modern codecs.

It is a further object of this invention to provide such a system and method which allows a device plugged into a jack to be correctly identified even if the specific components of the application circuit change or change in value.

It is a further object of this invention to provide such a system and method which is more user friendly.

The invention results from the realization that a device plugged into a computer can be more accurately identified if the details about the application circuit are stored in an updateable database referred to in order to adjust the electrical characteristics of the device measured by the codec. In summary, a middleware application "second guesses" the codec's identification of the device by taking into account the application circuit's effect on the measurement of the electrical characteristics of the device by the codec. Furthermore, in the event this second guess turns out to be wrong, that mistake is never made again since the middleware application learns from its mistake.

This invention features a system for determining the true electrical characteristic of a device, the system comprising a codec configured to measure at least one electrical characteristic of a device connected to a jack and to identify the device based on the measured electrical characteristic, an updateable database populated with at least application circuit information, and a software routine responsive to the measured electrical characteristic and configured to adjust the electrical characteristic measured by the codec based on the application circuit information in the database.

In one example, the updateable database is populated with resistance and capacitance values for the resistors and capacitors in the application circuit information. Typically, the updateable database is initially populated with default design resistance and capacitance values. Further included may be a routine for changing the default design resistance and capacitance values to reflect changes thereto.

In one embodiment, the software routine is implemented in a codes driver responsive to the register of the codec containing the measured electrical characteristic and the identification of the device. A middleware application may be responsive to the codec driver configured to more accurately identify the device based on the adjusted electrical characteristic. Also a database may be populated with devices and their electrical characteristics, the database accessible by the middleware application. Typically, a reconfiguration circuit is connected to the jack and the middleware application is further configured to query the user whether the identified device is correct and if so to activate the reconfiguration circuit based on the identified device and if not to access the database of devices allowing the user to choose a said device. The middleware application may be further configured to activate the reconfiguration circuit based on the device chosen by the user.

In another example, the software routine is implemented in a middleware layer responsive to a codec driver itself responsive to the register of the codec containing the measured electrical characteristic and the identification of the device. A reconfiguration circuit may be connected to the jack. Then, the middleware application is further configured to query the user whether the identified device is correct and if so to activate the reconfiguration circuit based on the identified device and if not to access a database of standard devices allowing the user to choose a said device. The middleware application may be further configured to activate the reconfiguration circuit based on the device chosen by the user.

In the preferred embodiment, there is an updateable database populated with the electrical characteristics of a plurality of devices whose electrical characteristics were measured by the codec but did not correspond to the device identified by the codec and a software routine responsive to the measured electrical characteristic and configured to adjust the identification of the device based on the electrical characteristics stored in the database. Typically, both software routines are implemented in a middleware application disposed between a driver for the codec and a user interface.

This invention also features a method of identifying a device plugged into a jack connected to an application circuit for the jack, the method comprising measuring at least one electrical characteristic of the device connected to a jack, adjusting the measured electrical characteristic based on the configuration of the applicant circuit, and identifying the device based on the adjusted measured electrical characteristic. In one example, measuring is carried out by a codec connected to the application circuit and adjusting includes referencing a database populated with application circuit component values. Further included may be the step of outputting a query to determine whether the identification is correct and if not populating a database with the correct identification.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 1:
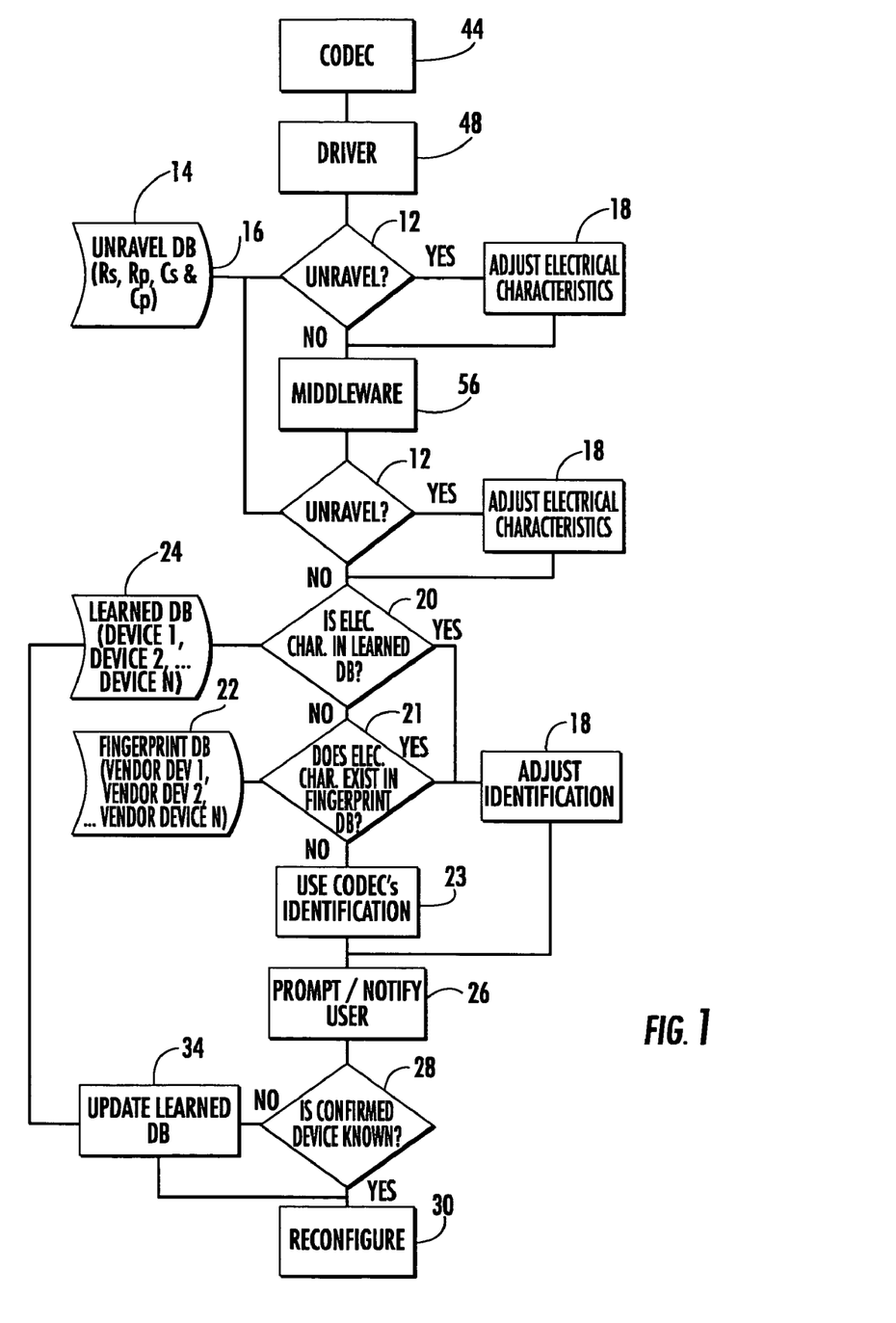
FIG. 1 is a flow chart showing the primary steps associated with one embodiment of the system and method of the subject invention.

In one embodiment, the primary steps associated with the processing circuitry and method of the subject invention are as shown in FIG. 1. Codec 44, preferably as set forth in the patent application discussed above, measures one or more electrical characteristics of a device plugged into a jack and identifies the device (sensed bits) step 12 as, for example, a speaker, headphones, a microphone, and the like. The output from Codec 44 is a set of bits representing the Codec's identification, and the raw bits representing the impedance values measured.

As stated in the Background section above, the application circuit connected between the codec and the jack, however, can affect the electrical characteristic measured by the codec and hence sometimes adversely affect the identification made by Codec 44. In accordance with the subject invention, database 14 is populated with the current resistance, capacitance, and other values 16 (application circuit configuration information) of the components of the application circuit. Those resistors and capacitors and especially any changes thereto made by the application circuit supplier can affect the electrical characteristics measured by Codec 44 and could result in an incorrect identification. If unraveling is initiated at step 12, to correct this situation, an adjustment is made to the measured electrical characteristic at step 18 after consulting database 14. Based on the adjusted electrical characteristic, or even based on the Codec's measured electrical characteristics, the identification of the device is adjusted beginning at step 20. Database 14 typically includes default design resistance and capacitance values as specified by the manufacturer of the application circuit. Database 14 can be updated, however, with the true values of the actual application circuit as implemented in a given audio subsystem.

In accordance with the invention, further adjustments can be made by consulting database 24 and/or optional vendor table 22. Table 22 is located in the platform configuration file, typically populated with standard (default) vendor specific devices and one or more of their electrical characteristics. Thus, if the adjusted electrical characteristic at step 18 more closely matches a device in table 22 than the device identified by Codec 44, the device stored in table 22 is now the identified device at step 19. Learned database 24, in turn, is typically populated with other devices and their electrical characteristics as discussed below. And, learned database 24 is preferably consulted first as shown at step 20. Once learned database 24 is populated, it is rare that table 22 need be consulted.

Once the device is identified, the user can be prompted for verification as shown at step 26. If the user verifies that the device actually plugged into the jack is the device identified, reconfiguration circuit 30 is activated as set forth in the patent application discussed above to make an adaptation for the device plugged into the jack. Typically this is accomplished by selectively positioning amplifiers between low on-impedance and high off-impedance states.

If, however, a user responds that the device identified is not the device actually plugged into the jack, then at step 28 the user is asked to identify the correct device, step 32. Reconfiguration (step 30) then proceeds using the correct device identified and, in addition, learned database 24 is updated, step 34 to include the new entry: the correct device input at step 32 and its adjusted measured electrical characteristic from step 18. Then, the next time that same device is plugged into the same jack, its measured electrical characteristic at step 18 will be used at step 20 after consulting database 24 to correctly identify the device and, when prompted, the user will indicate that the device identified is correct at step 28. In this way, once a user makes a correction with respect to an incorrectly identified device, the system thereafter gets it right and correctly identifies the device so the user does not have to repeatedly make the same correction.

Codec 44 measures the impedance of a device plugged into a jack. The measurement is read by driver 48 from the Codec, which is later used by the software modules. The measurement data read by driver 48 typically consists of the SR and OR values which represent the raw impedance measured and the S value which represents the Codec device guess (identification).

A flag indicating whether to unravel and unravel values at step 12 required to use in the unravel algorithm of step 18 is stored in a file such as the platform configuration file on a per jack basis. The platform configuration file is called "platform.cfg" 14. This configuration file is broken down into several sections, one for each vendor platform. In each platform section there exist "keys" that contain data values used to perform unraveling.

There are two aspects to unravel: component level unravel and circuit level unravel. The first applies when vendor uses a reference design but chooses alternate components the achieve it. In this case, unravel requires the component values to unravel the measured impedance to better identify the device. The second applies when a vendor uses a circuit that is not based on reference design. In this case, not only are the component values required, a circuit specific algorithm is also required.

Driver 48 and the middleware 56 (interface module) use the same algorithm 18 to perform component level unraveling which can be performed by either module. As the raw sensed data is received by the software, a decision is made whether to perform the unravel algorithm on the data at step 12. A flag in the configuration tables indicate to the software modules whether unraveling is required. If unraveling is required, component values 16 are needed to execute unravel algorithm. These values are retrieved from the configuration tables 14 at system start.

Circuit level unraveling is performed similarly as outlined by the steps above along with an additional software module that understands how to perform the actual circuit algorithm.

For learning, database 24 is used to store/retrieve all learned values. In Windows operating systems, the database used is the system registry.

In one embodiment, learned data is stored on a per AC97-Rev2.3 function code basis. So, for each function code specified by the specification, a table of learned data exists. The function codes indicate and define how each jack behaves. Jacks may have more than one function in the platform. For example a jack may behave as a microphone or as C/LFE speakers at any given time.

At system startup, middleware module 56 loads the learned data 24 from the system registry database and creates the tables for use later for learning. During system execution, as devices are detected in the jacks, the reported impedance (raw or unraveled) is matched up against the learned tables to identify the device.

Device identification uses the raw or unraveled impedance read from Codec 44 for determining the detected device. First, at step 20, the impedance is matched against the learned tables 24 based on the currently assigned function of the jack. If not identified, it matches it to the table of the jack's alternate assigned function. If still not identified, it searches the remaining function learned tables to complete the device identification process. In the event the learned tables cannot identify the device still, step 21 uses the vendor supplied device values in table 22. Finally, if the device is still unknown, the Codec's identification is used at step 23.

The device identification is presented to the user/application at step 26 and once confirmed at step 28 it is added to the learned tables for future use at step 34.

Figure 2:
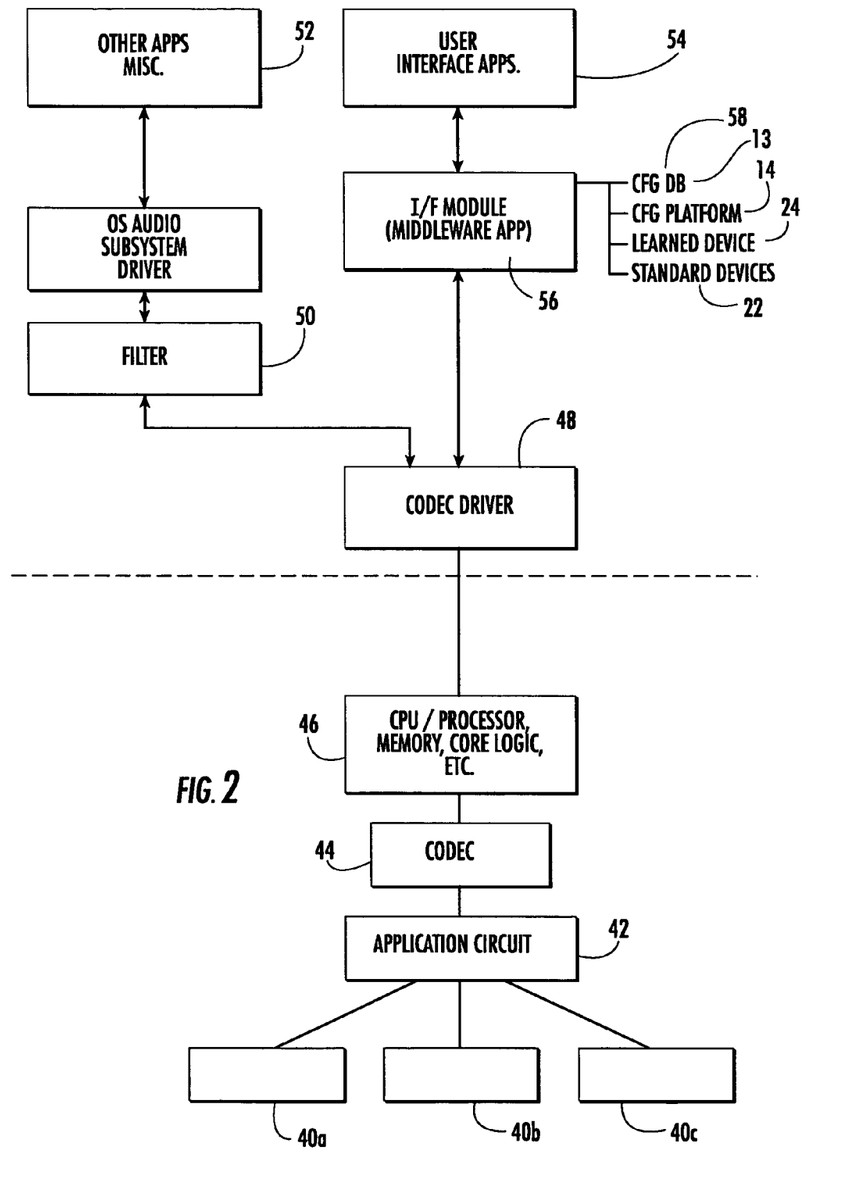
FIG. 2 is a block diagram showing the primary software and hardware components associated with a complete codec based system in accordance with the subject invention.

FIG. 2 shows jacks 40a-40c connected to application circuit 42, itself connected to codec 44 which is configured to measure at least one electrical characteristic of a device connected to the jack and to identify the device based on the measured electrical characteristic. Codec 44 is typically on the motherboard add-in/riser card of the computer along with the CPU, etc. 46, application circuit 42, and codec driver 48. For the sake of completeness, FIG. 2 also shows optional audio processing circuit 50 and miscellaneous applications 52.

In the preferred embodiment, middleware application 56 is the software responsive to the measured electrical characteristic output by codec 44 and configured to adjust that electrical characteristic measured by the codec based on the application circuit information stored in database 14 (step 18, FIG. 1). Also, middleware application 56 uses and accommodates for any changes to the default design application circuit information stored in database 14 when changes are made to the components of a given application circuit by a particular vendor. The platform configuration file 14 is used by the vendor to update the application circuit information.

In an alternative embodiment, all or selected functions of middleware application 56 could be implemented in codec driver 48 responsive to the registers of codec 44 and configured to measure the electrical characteristics and make the initial identification of a device plugged into any one of jacks 40a-40c. Typically, middleware layer 56 is responsive to codec driver 48 to more accurately identify the device plugged into any one of jacks 40a-40c based on the measured electrical characteristics and database 14. Driver 48 and middleware application 56 both, however, typically carry out unraveling steps 12 and 18, FIG. 1.

Middleware application 56 in connection with user interface 54 typically also provides the functionality associated with steps 26, 28, 32, and 34 of FIG. 1. So, middleware application 56 accesses database 24 populated with standard devices that are typically plugged into jacks 40a-40c and their electrical characteristics. Middleware application 56 activates user interface 54, FIG. 2 to query a user a monitor whether the identified device is correct and if so activates the reconfiguration circuit as set forth in steps 28 and 30, FIG. 1. If the device identified is not correct, database 22 is accessed by middleware application 56 to provide, through user interface 54, a list of standard devices which can be chosen by the user. After the user selects a given device, middleware application 56 activates the reconfiguration circuit in accordance with the user's selection.

Learned database 24, as stated above, is populated with at least the electrical characteristics of devices whose electrical characteristics were measured by codec 44 but did not correspond to the device identified by the codec at step 20, FIG. 1. Database 24 also includes, in the preferred embodiment, the electrical characteristics of devices whose electrical characteristics were measured by Codec 44 and which do correspond to the device identified by the Codec at step 20. Middleware application 56 is thus responsive to the measured electrical characteristic and configured to adjust the identification of the device based on the electrical characteristic stored in learned database 24, step 20, FIG. 2.

In this way, learned device database 24 is populated with the electrical characteristics of devices whose electrical characteristics were measured by codec 44 but were incorrectly identified by codec 44 as noted by the user via user interface 54. As explained above with reference to steps 32, 34 and 20, FIG. 1, middleware application 56, FIG. 2 is configured to adjust the codec's identification of the device based on learned database 24 so that after the first time the user adjusts an incorrect identification of a given device, the user never again has to make that correction. User interface 54 under the control of middleware application 56 prompts the user on a display to confirm the identification of the device plugged into jack 40 and if incorrect to return an indication of the correct device so middleware application 56 can populate learned devices database 24.

In this way, middleware application 56 populates learned devices database 24 with the correct devices and their electrical characteristics so that the next time the characteristic is measured, the user is prompted with an identification corresponding to the correct device.

Figure 3:
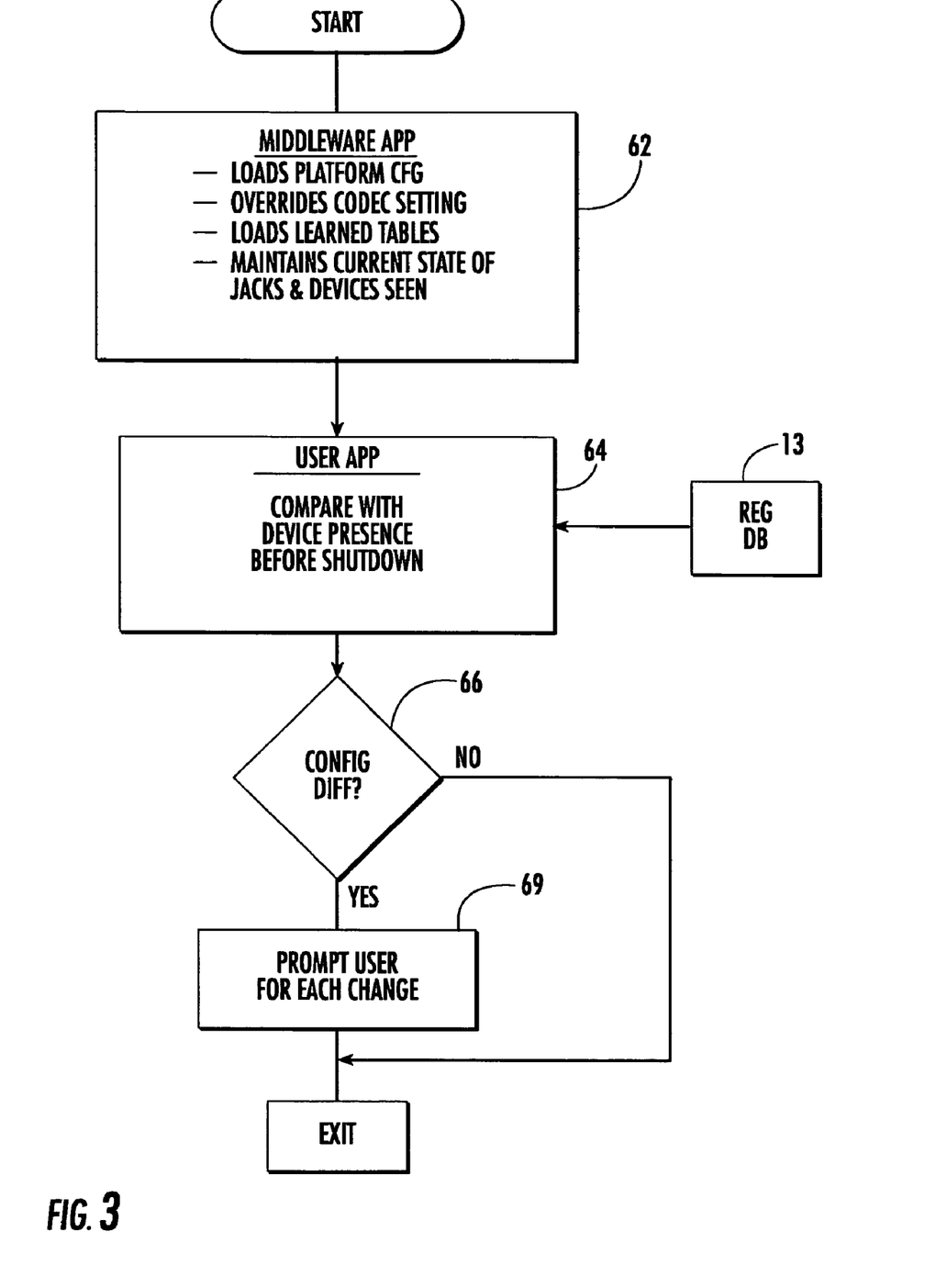
FIG. 3 is a flow chart showing the primary steps associated with an initialization routine for the subject invention.

As shown in FIG. 3, upon initialization, middleware application 56, FIG. 2 performs a sense cycle on all jacks and input/output connectors, step 62, FIG. 3. A comparison is made, step 64 with the configuration before system shut down by consulting configuration database 13.

If the configuration is different, step 66, user messaging is initiated for each changed jack, step 69. If the configuration is not different at step 66, the initialization process is complete.

Figure 4:
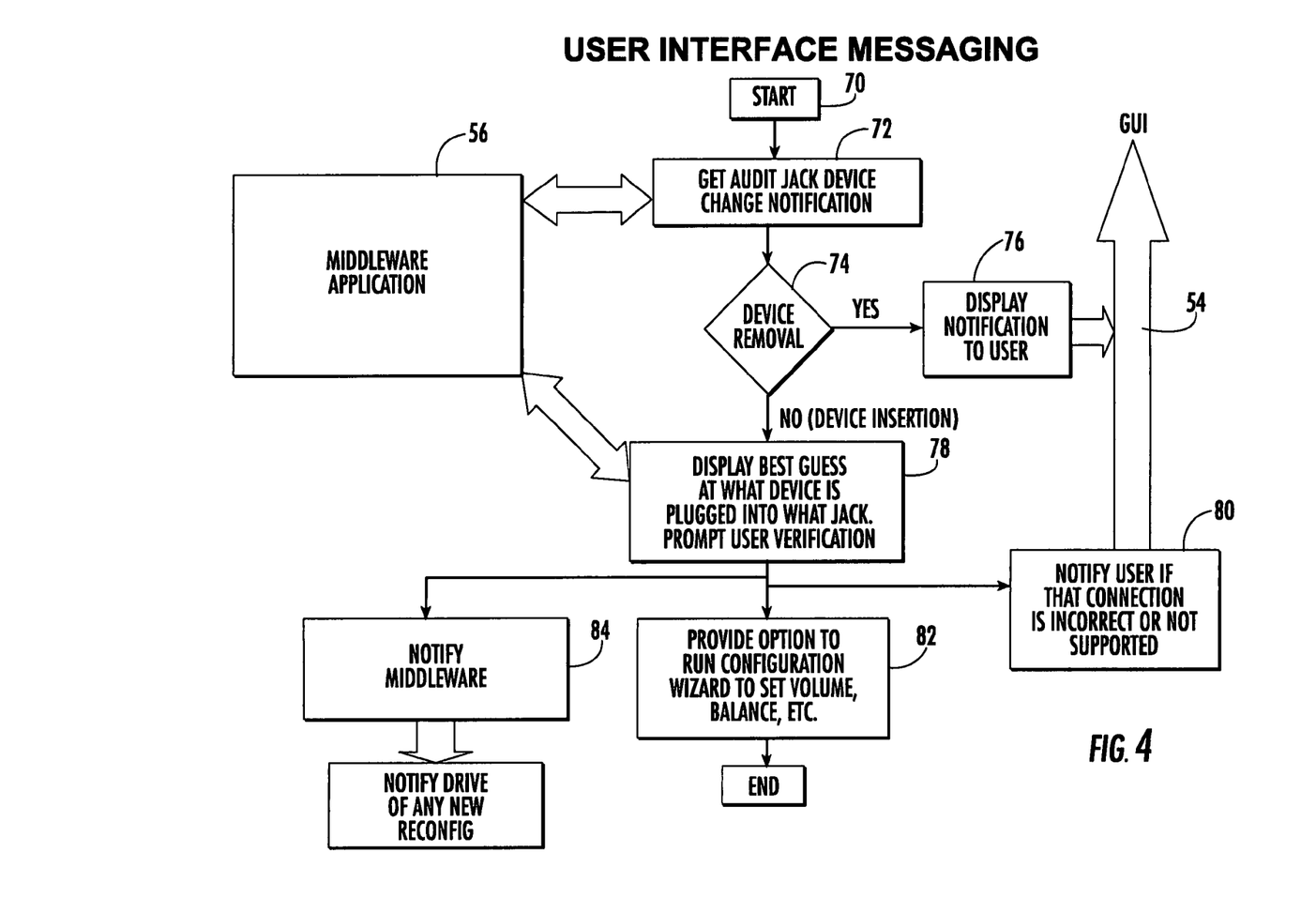
FIG. 4 is a flow chart showing the primary steps associated with an example of user interface messaging software for the subject invention.

Step 62 of FIG. 3 is explained in more detail in FIG. 4 where, after starting at step 70, the audio jack device change notification is input at step 72 and if there is an indication that a device has been removed from a jack at step 74, the user is notified at step 76 through user interface 54. Next, middleware application 56 displays to the user its best guess as to what device is plugged into what jack and prompts the user for verification as shown at step 78. This aspect of middleware application 76 is explained above with reference to FIGS. 1 and 2.

If the user indicates that the middleware application's best guess is correct then the codec driver is notified of any reconfiguration of hardware if required, step 84 and an option can be provided to run a configuration wizard to set the volume, balance, and the like, step 82. If the middleware application's best guess is incorrect as noted by the user, steps 32-34 of FIG. 1 are carried out. Failure to identify the correct device after carrying out those steps can result in notifying the user at step 80, FIG. 4 that the connection is incorrect or not supported.

Figure 5:
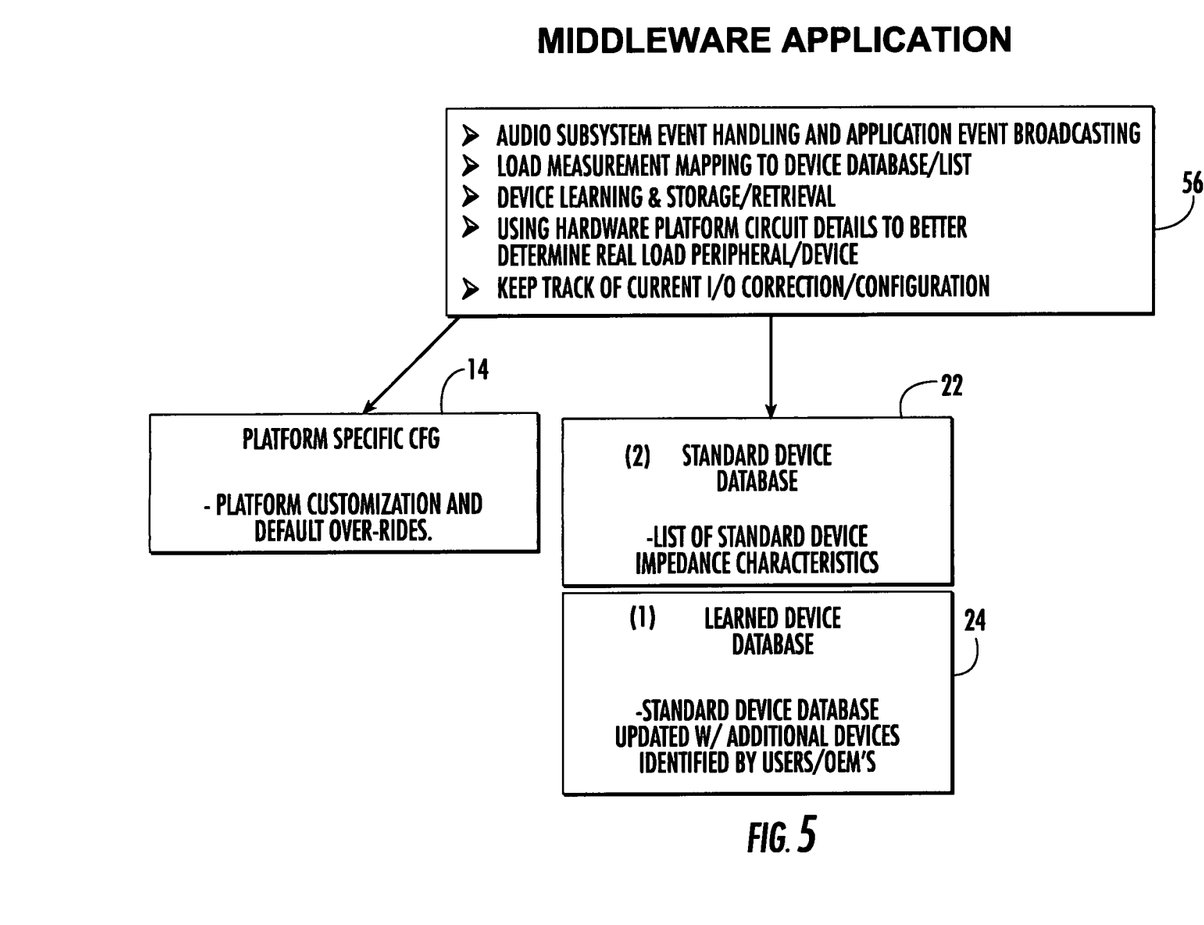
FIG. 5 is a block diagram showing the primary components associated with the middleware application in one embodiment of the subject invention.

FIG. 5 delineates the primary functions carried out by middleware application 56 including user messaging, load measurement mapping to device database/lists, device learning and storage and retrieval, the use of hardware platform circuit details to better determine real load peripherals and devices, and keeping track of current input/output corrections and configurations. Middleware layer 56 accesses platform specific configuration database 14 which includes platform customization and default overrides as discussed above. Middleware layer 56 also accesses standard device database 22 which includes a list of standard devices and their impedance characteristics and also learned device database 24 which includes standard devices updated with additional devices identified by users and original equipment manufacturers. Middleware application 56, FIG. 5 may also access a configuration database to maintain a list of what device is in what jack as discussed above with respect to steps 64 and 66 of FIG. 3. Middleware application 56 or another application checks the configuration of the system against the configuration database on startup to provide an alert of changes while the system was powered off, asleep, or in a standby mode.

Figure 6:
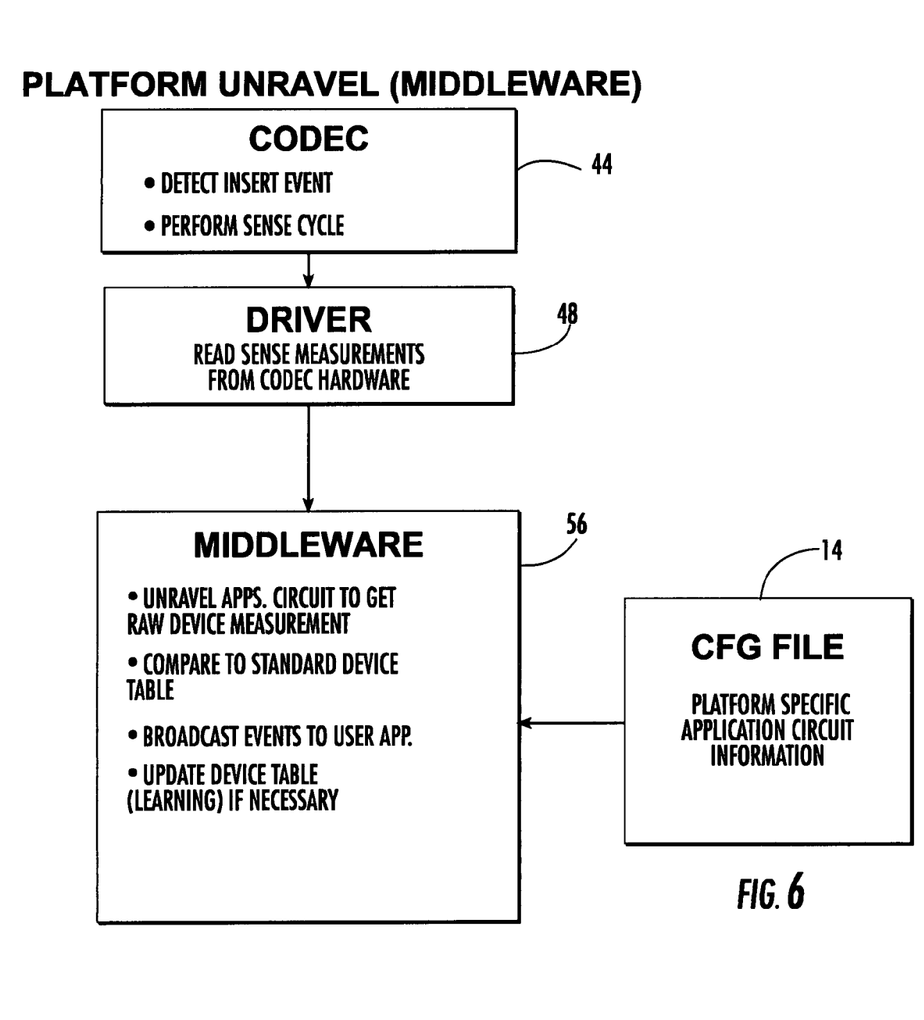
FIG. 6 is a flow chart showing the primary steps associated with the system for determining the true electrical characteristics of a device implemented in the middleware application in one embodiment of the subject invention.

Codec 44, FIG. 6 detects a device plug-in to jack insert event and performs a sense cycle as discussed above with respect to FIG. 3. The codec driver 48 reads the sense measurements from the codec hardware and middleware layer 56 evaluates the application circuit to adjust the electrical characteristics as discussed above with reference to FIG. 1 by consulting configuration database 14. That database includes the platform specific application circuit information. Middleware layer 56 also performs the other functions discussed above.

Figure 7:
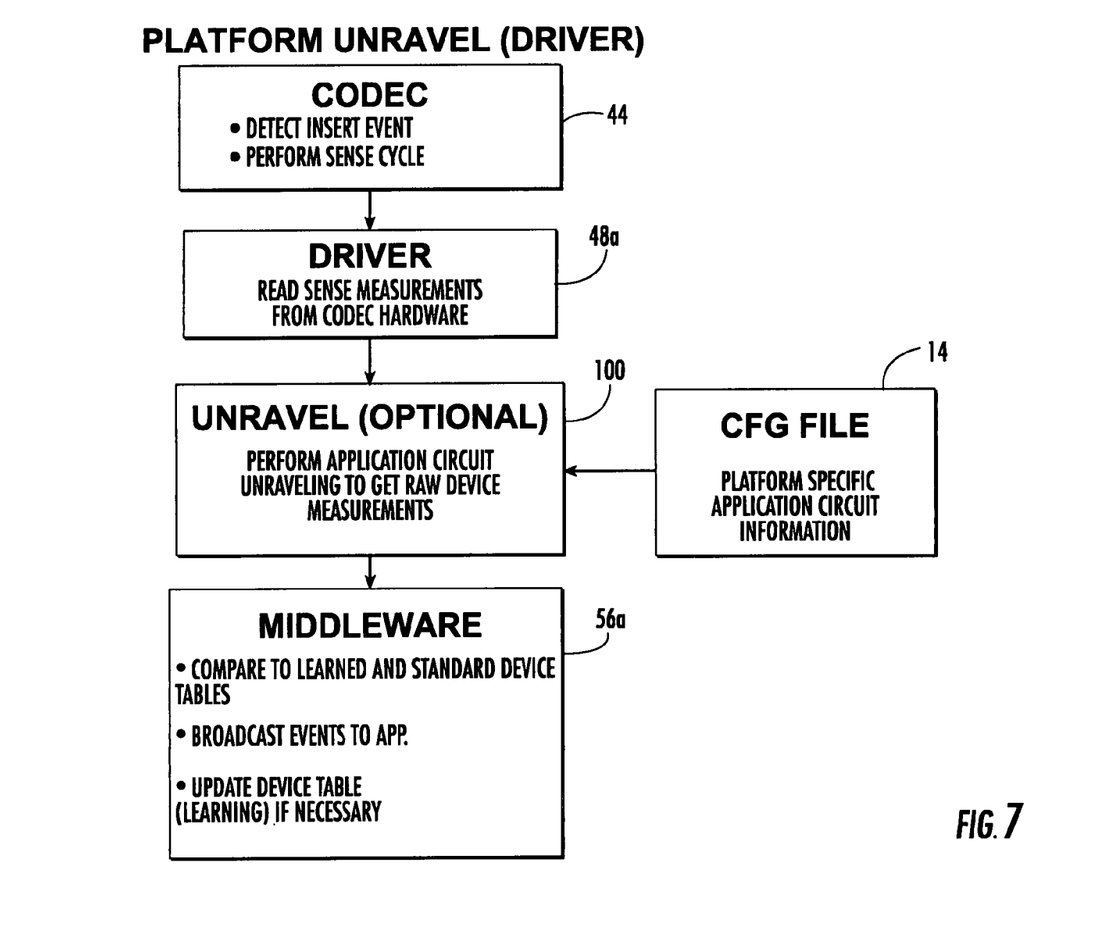
FIG. 7 is a flow chart depicting the primary steps associated with the system for determining the true electrical characteristics of a device implemented in the codec driver in accordance with another embodiment of the subject invention.

It is possible, however, to configure or program codec driver 48a, FIG. 7 to consult configuration database 14 as shown at step 100, FIG. 7 and to adjust the electrical characteristic measured by the codec based on the application circuit information stored in database 13 and then provide the adjusted electrical characteristic of the device to middleware layer 56a. Typically, however, both driver 48a and middleware application 56a perform the unraveling function. Driver 48a is implemented in the kernel mode of the microprocessor operating system while middleware application 56a is implemented in the user mode of the microprocessor operating system.

Figure 8:
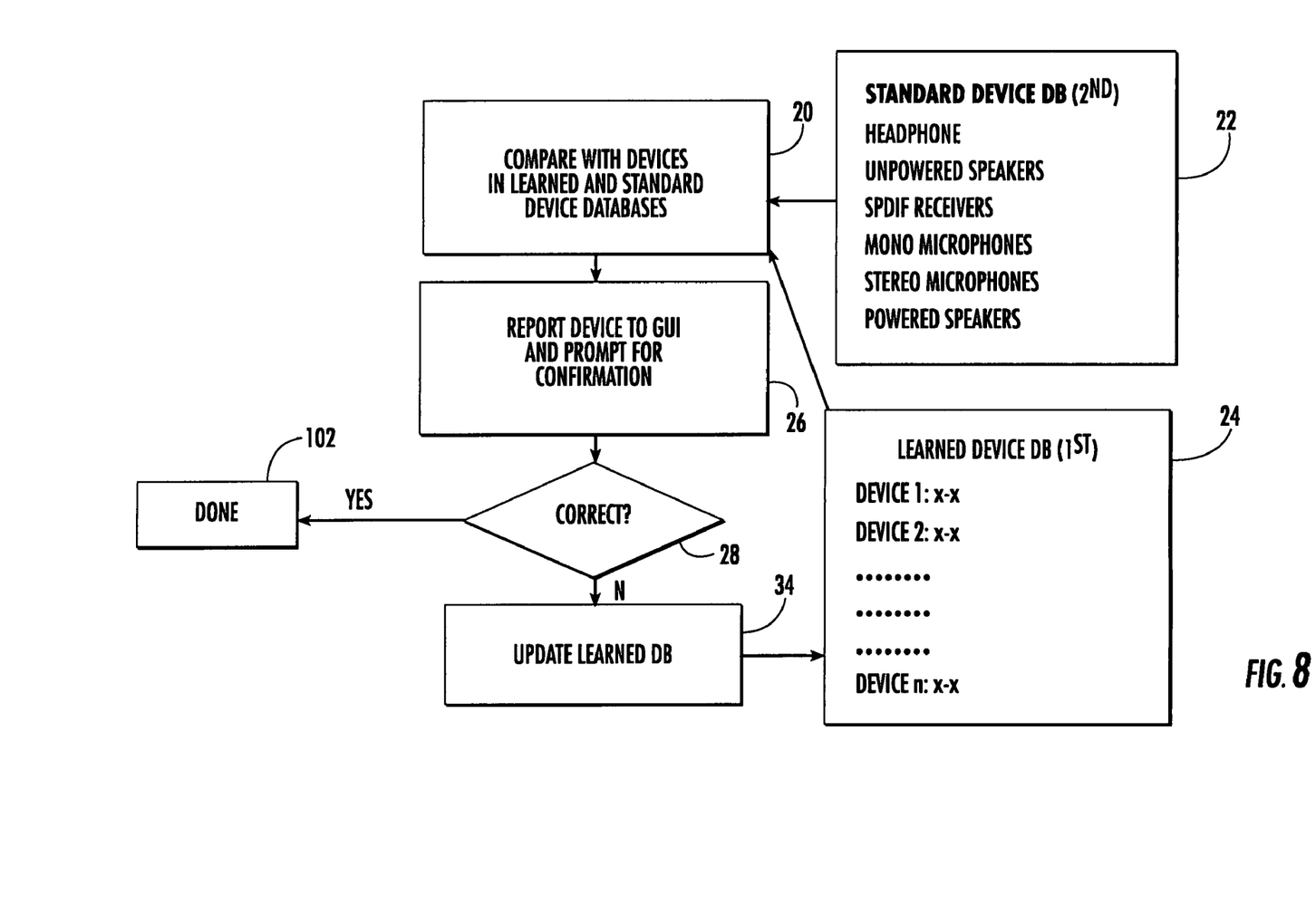
FIG. 8 is a flow chart showing the primary steps associated with an example of a system and method for verifying the identification of a device in accordance with the subject invention.

FIG. 8 shows in more detail steps 20, 26, 28, and 34 of FIG. 1. At step 20, an adjustment is made to the identification of the device based on the electrical characteristics of the application circuit as discussed above by consulting standard device database 22 and/or learned device database 24. Standard device database 22 may include information about different headphones, unpowered speakers, SPDIF receivers, mono microphones, stereo microphones, powered speakers, and the like. At step 26, the middleware layer's best guess as to the identification of the device is reported to the user interface and the user is prompted for confirmation at step 26. If the user confirms the determination made by the middleware application at step 28, that aspect of the processing is complete as shown at step 102. If the user identifies a device different than the device identified by the middleware layer at step 28, however, the middleware layer updates learned database 24 as shown at step 34 and adds that device to the list of learned devices as described above.

Figure 9:
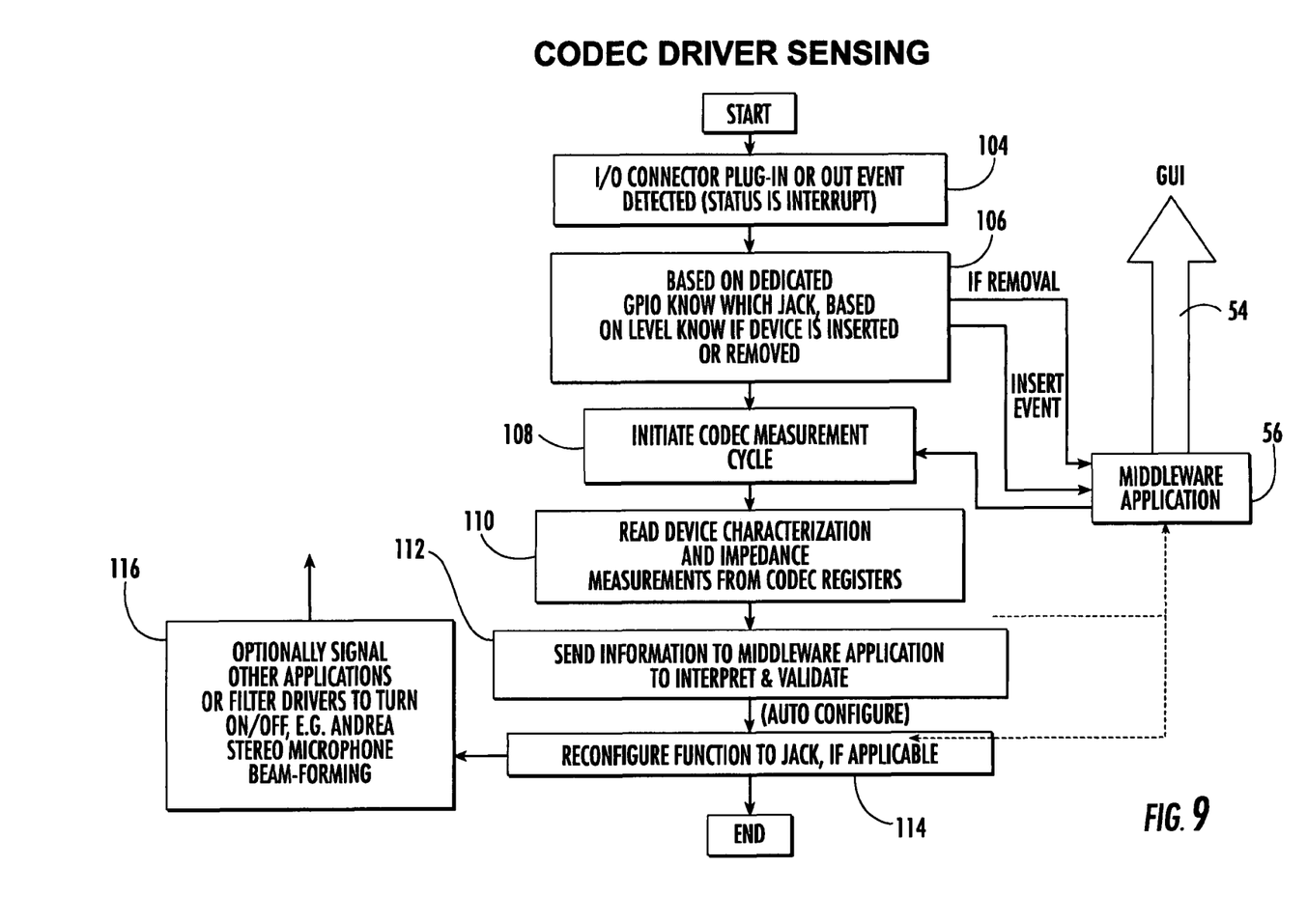
FIG. 9 is a flow chart depicting the primary steps associated with a codec driver sensing algorithm useful in connection with the subject invention.

Codec driver sensing in accordance with the subject invention includes the step of detecting an input/output connector plug in or out event, step 104, FIG. 9 and a determination of whether a device is plugged in or removed, step 106. The codec measurement cycle is then initiated step 108 under the control of middleware application 56 and the impedance measurements from the codec register are analyzed, step 110. That information is sent to the middleware application 56 to interpret and validate as discussed above, step 112, and the jack is reconfigured step 114. In optional step 116, other applications are signaled or filter drivers are turned off as applicable.

The result, in any embodiment, is a system for and method of determining the true electrical characteristics of a device plugged into the jack of a computer and for verifying the identification of such a device.

The resulting system and method reduces costly support calls, is fully compliant with the specification for modern codecs, allows a device plugged into a jack to be correctly identified even if the specific components of the application circuit change or change in value, and is more user friendly.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A system for determining the true electrical characteristic of a device, the system comprising:
   a codec circuitry that measures at least one electrical characteristic of a device connected to a jack and identifies the device based on the measured electrical characteristic;
   an updateable database stored on a non-transitory computer readable memory and populated with application circuit information regarding the current configuration of one or more application circuits coupled between the jack and the codec circuitry; and
   a processing module including a processor and a memory storing computer readable and executable instructions that enable the processing module to receive the measured electrical characteristic from the codec circuitry, adjust the electrical characteristic measured by the codec circuitry based on the application circuit information in the updatable database, and update the application circuit information populating the updatable database if the configuration of an application circuit changes such that upon updating the updatable database the codec circuitry correctly identifies a device plugged into a jack.

2. The system of claim 1 in which the updateable database is populated with resistance and capacitance values for the resistors and capacitors in the application circuit information.

3. The system of claim 2 in which the updateable database is initially populated with default design resistance and capacitance values.

4. The system of claim 3 further including a routine for changing the default design resistance and capacitance values to reflect changes thereto.

5. The system of claim 1 in which the software routine is implemented in a codec driver responsive to the register of the codec containing the measured electrical characteristic and the identification of the device.

6. The system of claim 5 further including a middleware application responsive to the codec driver configured to more accurately identify the device based on the adjusted electrical characteristic.

7. The system of claim 6 further including a database populated with devices and their electrical characteristics, the database accessible by the middleware application.

8. The system of claim 7 further including a reconfiguration circuit connected to the jack.

9. The system of claim 8 in which the middleware application is further configured to query the user whether the identified device is correct and if so to activate the reconfiguration circuit based on the identified device and if not to access the database of devices allowing the user to choose a said device.

10. The system of claim 9 in which the middleware application is further configured to activate the reconfiguration circuit based on the device chosen by the user.

11. The system of claim 1 in which the software routine is implemented in a middleware layer responsive to a codec driver itself responsive to the register of the codec containing the measured electrical characteristic and the identification of the device.

12. The system of claim 11 further including a reconfiguration circuit connected to the jack.

13. The system of claim 12 in which the middleware application is further configured to query the user whether the identified device is correct and if so to activate the reconfiguration circuit based on the identified device and if not to access a database of standard devices allowing the user to choose a said device.

14. The system of claim 13 in which the middleware application is further configured to activate the reconfiguration circuit based on the device chosen by the user.

15. The system of claim 1 further including:
   a second updateable database populated with at least the electrical characteristics of a plurality of devices whose electrical characteristics were measured by the codec circuitry but did not correspond to the device identified by the codec circuitry, and
   a second processing module responsive to the measured electrical characteristic and configured to adjust the identification of the device based on the electrical characteristics stored in the database.

16. The system of claim 15, wherein the first and second processing modules comprise software routines implemented in a middleware application disposed between a driver for the codec circuitry and a user interface.

17. A method of identifying a device plugged into a jack connected to an application circuit coupling the jack to an identification circuit, the method comprising:
   measuring at least one electrical characteristic of the device connected to a jack;
   adjusting the measured electrical characteristic based on the configuration of the application circuit coupling the jack to the identification circuit, including referencing an updateable database populated with application circuit information regarding the current configuration of one or more application circuits coupled to the jack; and identifying the device based on the adjusted measured electrical characteristic, including updating the application circuit information if the configuration of an application circuit changes such that the system can identify a device plugged into a jack even if the configuration of an application circuit changes.

18. The method of claim 17 in which measuring is carried out by a codec connected to the application circuit.

19. The system of claim 17 in which adjusting includes referencing a database populated with application circuit component values.

20. The system of claim 17 further including outputting a query to determine whether the identification is correct and if not populating a database with the correct identification.

21. A system for determining the true electrical characteristic of a device, the system comprising:

a codec circuitry that measures at least one electrical characteristic of a device connected to a jack and identifies the device based on the measured electrical characteristic;

an updateable database stored on a non-transitory computer readable memory and populated with application circuit information of one or more application circuits coupled between the jack and the codec circuitry; and a processing module including a processor and a memory storing computer readable and executable instructions that enable the processing module to receive the measured electrical characteristic from the code circuitry and adjust the electrical characteristic measured by the codec circuitry based on the application circuit information populating the updatable database.

* * * * *